United States Patent
Pusch et al.

(10) Patent No.: US 11,827,563 B2
(45) Date of Patent: Nov. 28, 2023

(54) METHOD FOR HEAT TREATMENT OF A FEED MATERIAL

(71) Applicant: Binder + Co AG, Gleisdorf (AT)

(72) Inventors: Markus Alfred Pusch, Graz (AT);
Harald Tschernko, Gleisdorf (AT);
Bernhard Neukam, Stattegg (AT);
Ernst Erwin Brunnmair, Graz (AT);
Hartmut Kremer, Wernberg (AT);
Julian Neubacher, Graz (AT)

(73) Assignee: Binder + Co AG, Gleisdorf (AT)

( * ) Notice: Subject to any disclaimer, the term of this patent is extended or adjusted under 35 U.S.C. 154(b) by 384 days.

(21) Appl. No.: 17/246,185

(22) Filed: Apr. 30, 2021

(65) Prior Publication Data
US 2021/0309572 A1 Oct. 7, 2021

Related U.S. Application Data

(60) Division of application No. 16/539,741, filed on Aug. 13, 2019, now Pat. No. 11,040,911, which is a continuation-in-part of application No. 16/276,410, filed on Feb. 14, 2019, now Pat. No. 10,399,901, which is a division of application No. 15/315,378, filed as application No. PCT/AT2015/050142 on Jun. 5, 2015, now Pat. No. 10,233,118.

(30) Foreign Application Priority Data

Jun. 5, 2014 (AT) ................................ A 50088/2014

(51) Int. Cl.
 *C04B 20/06* (2006.01)
(52) U.S. Cl.
 CPC ................... *C04B 20/068* (2013.01)
(58) Field of Classification Search
 CPC ............................ C04B 20/06; C04B 20/068
 USPC ....................................................... 106/820
 See application file for complete search history.

(56) References Cited

U.S. PATENT DOCUMENTS

| | | | |
|---|---|---|---|
| 2,625,512 A | 1/1953 | Powell | |
| 4,180,185 A | 12/1979 | Fujiki et al. | |
| 10,233,118 B2 | 3/2019 | Tschernko | |
| 11,040,911 B2 * | 6/2021 | Pusch | C04B 20/068 |
| 2017/0107146 A1 | 4/2017 | Tschernko | |
| 2017/0107147 A1 | 4/2017 | Tschernko | |
| 2019/0194070 A1 | 6/2019 | Tschernko | |
| 2020/0039879 A1 | 2/2020 | Pusch et al. | |

FOREIGN PATENT DOCUMENTS

| | | |
|---|---|---|
| DE | 197 22 906 | 12/1998 |
| WO | WO 2009/009817 | 1/2009 |
| WO | WO 2013/053635 | 4/2013 |
| WO | WO 2015/184481 | 12/2015 |
| WO | WO 2015/184482 | 12/2015 |

OTHER PUBLICATIONS

International Search Report issued for PCT/AT2015/050142, dated Sep. 11, 2015.
International Search Report issued for PCT/AT2015/050143, dated Sep. 24, 2015.
Notice of Allowance and Fees Due for U.S. Appl. No. 15/315,253, dated Oct. 5, 2017.
Office Action for U.S. Appl. No. 15/315,378, dated Mar. 14, 2018.
Notice of Allowance and Fees due in U.S. Appl. No. 15/315,378, dated Nov. 13, 2018.
Notice of Allowance for U.S. Appl. No. 16/276,410, dated May 1, 2019.
Notice of Allowance for U.S. Appl. No. 16/539,741, dated Mar. 4, 2021.

* cited by examiner

*Primary Examiner* — Edward M Johnson
(74) *Attorney, Agent, or Firm* — Morse, Barnes-Brown & Pendleton, P.C.; Sean D. Detweiler, Esq.

(57) ABSTRACT

A method for heat treatment of a grain-shaped feed material uses a calcination device in order to remove carbonate or water of crystallization from the feed material. In order to continuously check the quality of the heat treatment process, the bulk density of the heat-treated material is measured continuously, wherein upon detection of a deviation of the determined bulk density from the at least one desired bulk density at least one heat treatment parameter of the heat treatment is adapted automatically or manually.

7 Claims, 3 Drawing Sheets

METHOD FOR HEAT TREATMENT OF A FEED MATERIAL

CROSS-REFERENCE TO RELATED APPLICATIONS

This application is a divisional of and claims priority to and the benefit of co-pending U.S. application Ser. No. 16/539,741, filed Aug. 13, 2019, which is a continuation-in-part of and claimed priority to and the benefit of U.S. application Ser. No. 16/276,410, filed Feb. 14, 2019, which was a division of U.S. application Ser. No. 15/315,378, filed Nov. 30, 2016, now U.S. Pat. No. 10,233,118, which was a national stage of PCT/AT2015/050142 filed Jun. 5, 2015, which claims priority to Austrian Application No. GM 50088/2014, filed Jun. 5, 2014, all of which are incorporated herein by reference.

FIELD OF THE INVENTION

The invention relates to a method for the expansion of sand grain-shaped raw material in which the raw material drops downwards through a substantially vertical heated shaft provided with means for forming a temperature profile, in which a shaft flow prevails wherein as a result of heat transfer in the shaft, the raw material expands to form expanded granulate and the granulate formed is passed into a pneumatic conveying line with a conveying flow for further transport, as well as to an apparatus which comprises a separating device, preferably a gas cyclone which can be connected to a pneumatic conveying line.

The invention also relates to a method for heat treatment of a grain-shaped feed material wherein a first material flow containing the grain-shaped feed material is fed into one end of a calcination device wherein the grain-shaped feed material undergoes a heat treatment within the calcination device in order to produce grain-shaped heat-treated material by removing water of crystallization or carbon dioxide from the grain-shaped feed material; wherein a second material flow containing the grain-shaped heat-treated material is released from a second end of the calcination device.

BACKGROUND OF THE INVENTION

A method for producing an expanded granulate from sand grain-shaped raw material is disclosed in WO 2013/053635 A1, where the object consists in adjusting a closed surface of the expanded granulate in a controllable manner so that the expanded granulate exhibits no hygroscopicity or hardly any hygroscopicity. In addition, the possibility of specifically influencing the surface structure of the expanded granulate and therefore the roughness is to be provided. To this end, this document proposes providing a plurality of independently controllable heating elements arranged along the drop section of the sand grain-shaped raw material and performing a temperature detection along the drop section, wherein the heating elements are controlled depending on the detected temperature below the region in which the expansion process takes place. Removal of the expanded granulate from the lower end of the drop section is ensured by means of a pneumatic conveying line into which the drop section opens.

As a result of the vertical alignment of the shaft and as a result of the additional introduction or extraction of process gases accompanying the expansion process, flows occur inside the shaft which act on the sand grain-shaped raw material. In particular, the formation of a near-wall upwardly directed boundary layer flow has a positive effect on the quality of the expansion process since this boundary layer flow prevents any baking of the sand grain-shaped raw material on the wall of the shaft. If the expansion shaft is closed towards the top, in addition to the upwardly directed boundary layer flow, a central downwardly directed core flow is established. This core flow prevents some of the above-described boundary layer flow and therefore results in baked-on deposits. The influence of the core flow can be reduced by the hitherto-known extraction/in-blowing of process gas from/into the head region of the shaft.

Such above-described baked-on deposits on the shaft walls has the result that the heat transfer from the shaft walls to the raw material deteriorates. In addition, this results is a detachment of the boundary layer flow which leads to additional baked-on deposits in other regions of the shaft. As a result, the quality of the expansion process deteriorates appreciably and the fraction of undesired, unexpanded granulate leaving the shaft is increased.

Since the sand grain-shaped raw material is a naturally occurring raw material, this has fluctuations in its composition, for example, in the fraction of propellants. This has the result that at constant process parameters, possibly during the formation of a specific temperature profile in the shaft by the variously controllable heating elements, the quality of the expansion process depending on the condition of the raw material is not constant.

In known processes the quality of the expansion process is only measured on a random sample basis and the process is then re-adjusted or stopped.

It can thus be seen to be a disadvantage of the prior art that neither the fluctuating composition of the sand grain-shaped raw material nor the formation of baked-on deposits can be detected promptly, which in each case results in a deterioration of the quality of the end product since the fraction of the unexpanded granulate increases or the desired properties of the expanded granulate are not achieved.

DE 6608156 U relates to a device for determining the litre weight of combustion material, wherein a container connected to a weighing device is filled continuously via a double vibrating sieve and combustion material can be discharged continuously from the container by means of a discharge device.

Calcination devices are known to be used for thermal decomposition of various materials such as carbonate ores, e.g. limestone, or hydrated minerals, e.g. gypsum. In the calcination device the feed material undergoes a heat treatment by which carbon dioxide or water of crystallization is removed from the feed material either in gaseous form or as steam.

SUMMARY OF THE INVENTION

One object of the invention is to provide a method for producing an expanded granulate from sand grain-shaped raw material and a device for measuring the bulk density, which does not have the described disadvantages and ensures that the quality of the expansion process is continuously monitored. The method should ensure trouble-free and low-maintenance operation. The device should be characterized by a simple and reliable design. Furthermore, it should be possible to retrofit the invention to existing systems without major expenditure.

This object is achieved by the method mentioned initially whereby the bulk density of the expanded granulate is measured continuously, wherein upon detection of a deviation from at least one defined bulk density, the temperature profile in the shaft is automatically or manually adjusted and/or the feeding of raw material into the shaft is reduced automatically or manually.

The invention is based on the fact that as a result of a continuous measurement of the bulk density, the quality of the expansion process is continuously monitored. If the bulk density changes, the expansion process can be adapted accordingly. This can be accomplished on the one hand, whereby a signal, for example, a warning tone, notifies the user that an adjustment of the process is required or on the other hand, by an automated processes wherein the system automatically adapts the process according to predefined parameters.

If a fluctuation condition of the raw material is determined on the basis of the variation of the bulk density, this can be compensated by adapting the temperature profile in the shaft. If however baked-on deposits in the shaft are determined as a result of the measurement, the feeding of raw material can be reduced, preferably stopped in order to prevent further baked-on deposits in the shaft and thus minimize the repair expenditure.

With regard to the sand grain-shaped raw material, not only mineral sands can be used in which water is bound as propellant such as, for example, pearlite or obsidian sand. This can also comprise mineral dust which is mixed with water-containing mineral binder where in this case the water-containing mineral binder acts as propellant. The expansion process can in this case proceed as follows: the mineral dust which consists of relatively small sand grains having a diameter of, for example, 20 pm, forms larger grains of, for example, 500 pm with the binder. At a critical temperature the surfaces of the sand grains of the mineral dust become plastic and form closed surfaces of the larger grains or melt to form such. Since the closed surface of an individual larger grain is usually overall smaller than the sum of all the surfaces of the individual sand grains of the mineral dust which are involved in the formation of this larger grain, in this way surface energy is gained or the ratio of surface to volume decreases. At this moment, larger grains each having a closed surface are present where the grains comprise a matrix of mineral sand dust as well as water-containing mineral binder. Since the surface of these mineral grains as previously are plastic, the forming water vapour can subsequently expand the larger grains. That is, the water-containing mineral binder is used as propellant. Alternatively mineral dust can also be mixed with a propellant, where the propellant is blended with mineral binder which preferably contains water. $CaCO_3$ for example can be used as propellant. In this case, the expansion process can take place similarly to that described above: the mineral dust which has a relatively small sand grain size (for example, 20 pm diameter) forms larger grains (for example, 500 μm diameter) with the propellant and the mineral binder. Upon reaching a critical temperature, the surfaces of the sand grains of the mineral dust become plastic and form a closed surface of the larger grains or fuse to form such. The closed surfaces of the larger grains are plastic as previously and can now be expanded by the propellant. If the mineral binder is water-containing, this can function as additional propellant. Thus, in a preferred embodiment of the method according to the invention it is provided that the mineral material with propellant comprises a mineral material in which water is bound and acts as propellant or mineral dust mixed with water-containing mineral binder which acts as propellant or mineral dust mixed with a propellant which is blended with mineral binder, wherein the mineral binder preferably contains water and acts as additional propellant. In order to be able to carry out the method presented as efficiently as possible, in addition to a shaft furnace it is preferable to provide a plurality of heating zones with (independently of one another) controllable heating elements as well as an intelligent regulating and control unit. This controls the heating elements preferably as a function of measured temperatures along the furnace shaft.

According to a preferred embodiment, the conveying flow is produced by an extraction device. If the extraction device is attached at the end of the conveying line facing away from the shaft, a conveying flow is obtained over the entire length of the conveying line, where other elements such as, for example, filter systems can be attached in the conveying line.

In another embodiment, it is provided that the expanded granulate is separated from the conveying flow in the conveying line by a separating device, preferably a gas cyclone. By attaching a separating device in the conveying line, it is possible to separate the expanded granulate. Since the expanded granulate comprises the end product of the method, the concentrated removal from the conveying flow, in particular by a gas cyclone, is advantageous since this can be connected to a container such as, for example, a silo.

In a further preferred embodiment, the bulk density of the granulate separated by the separating device, in particular the gas cyclone is measured. A measurement at this point of the process is particularly advantageous since no additional complex units are required in the conveying line such as possibly optical media or a separate measuring line.

According to a particularly preferred embodiment the separated expanded granulate is concentrated to form a granulate flow and this is guided into a measuring container, wherein the measuring container is connected to a measuring device to determine the bulk density. In this way, a measurement of the bulk density is achieved over a defined volume of the measuring container and the mass weighed by means of the measuring device is achieved. In this case, the geometry of the measuring container should preferably be configured very simply, possibly as a cylinder or rectangular prism. As a result of the concentrating of the granulate flow, a uniform filling of the measuring container is ensured so that this is sufficiently filled even with low utilization of the process or a change in the quality of the expansion process is detected sufficiently rapidly.

A further preferred embodiment provides that a dosing element is provided between shaft and conveying line, in which the quantity of granulate which is transferred from the shaft into the conveying line is regulated by means of means for regulation so that a defined material accumulation of the granulate is formed in the dosing element as buffer, which decouples the shaft flow from the conveying flow. This arrangement in particular has positive effects on the shaft flow if the shaft flow is thereby decoupled from the conveying flow since pressure fluctuations from the conveying line, possibly due to the cleaning cycle of a filter, no longer affect the shaft flow and the frequency of baked-on deposits in the shaft can also be reduced as a result.

Further particularly preferred embodiments provide that process air is extracted from the head region of the shaft or that process air is blown into the head region of the shaft in order to stabilize the part of the shaft flow directed to the head region. This variant achieves a particularly high quality of the expansion process since as a result of the extraction or blowing-in of process air, the flow conditions are stabilized in that no secondary flows promoting harmful baked-on deposits are promoted.

A device according to the invention for measurement of the bulk density of the expanded granulate comprises a separating device configured as a gas cyclone which can be connected to a pneumatic conveying line, wherein at least one measuring container which has a base surface for receiving at least a part of the granulate flow from the separating device configured as a gas cyclone is arranged underneath the gas cyclone in the operating state, wherein the measuring container is connecting to a measuring device for determining the bulk density. It has proved to be very advantageous if the separating device is configured as a gas cyclone although other separating devices are also feasible.

This device is based on the fact that the granulate separated by the separating device (by the gas cyclone) is transferred into a measuring container in order to fill this and keep it filled, wherein the entire granulate flow need not enter into the measuring container, a part thereof is sufficient. Since the measuring container is located underneath the gas cyclone in the operating state, no further conveying device is required, gravity is sufficient. The bulk density can now be measured in a simple manner by means of a suitable measuring device using the defined volume of the measuring container.

In a further preferred embodiment of a device according to the invention for measuring a bulk density of the expanded granulate, a means for concentrating the granulate flow, preferably a funnel, is disposed between the separating device configured as a gas cyclone and the measuring container, whereby a particularly simple concentrating is achieved. As a result of the formation of the concentrated granulate flow, filling of the measuring container is ensured even when little granulate is located in the conveying flow.

A further particularly preferred embodiment of a device according to the invention for measuring the bulk density of the expanded granulate provides that the measuring container is connected to the measuring device via a side arm, whereby a particularly simple positioning of the measuring container in the granulate flow is achieved which can also be retrofitted to already existing systems.

In a further preferred embodiment of a device according to the invention for measuring a bulk density of the expanded granulate, the measuring device is configured as a weighing device, preferably as scales. This simple form of weight determination allows a technically non-complex and cost-effective measurement of the bulk density and can be installed without major additional expenditure.

According to a further particularly preferred embodiment of a device according to the invention for measuring the bulk density of the expanded granulate, an overflow for at least a part of the granulate flow is provided on the measuring container. This variant makes it possible to prevent an accumulation of the granulate flow when the measuring container is completely full whereby the excess part of the flow can escape from the measuring container, preferably over the edge of the measuring container.

In a further particularly preferred embodiment of a device according to the invention for measuring the bulk density of the expanded granulate, the measuring container has openings in the base surface to allow at least a part of the granulate flow to drain continuously. This arrangement ensures that a certain part, preferably 60% of the entire production quantity of the expanded granulate, can flow continuously through the measuring container in order to enable a prompt measurement of the bulk density and thus the determination of the expansion quality.

A second object of the intervention is to provide a method for heat treatment of a grain-shaped feed material, especially a calcination process, as well as a system comprising a calcination device and a measuring device, which ensure that the quality of the calcination process is continuously monitored. The method should ensure trouble-free and low-maintenance operation. The system should be characterized by a simple and reliable design. Furthermore, it should be possible to retrofit existing systems without major expenditure.

Due to inhomogeneity of the feed material, which can be pre-refined ore or pre-refined mineral material, the composition of the feed material, especially the content of carbonate or water of crystallization, may vary. Because of the fluctuation of the composition of the feed material also the quality of the heat-treated material can vary considerably, when the heat treatment parameters are kept stable and are not adapted to the current feed material.

In order to be able to monitor the quality of the heat treatment within the calcination device continuously and to be able to automatically or manually adapt at least one of the heat treatment parameters so that fluctuations in the quality of the feed material can be compensated, it is provided that the bulk density of the heat-treated material produced within the calcination device is measured continuously and at least one of the heat treatment parameters is adapted automatically or manually upon detection of a deviation of the determined bulk density from the at least one desired bulk density. This measure ensures that changes of the composition of the feed material can be compensated by the heat treatment in order to maintain a consistent high quality of the heat-treated material. Measurement of the bulk density is particularly suitable for determining the quality of the heat-treated material, as the bulk density changes due to the thermal decomposition in the calcination device as carbon dioxide and/or water of crystallization (in form of steam) are removed from the feed material by the heat treatment.

The method of continuously determining the bulk density itself as well as the device for measuring the bulk density are designed analogous to the method and the device described in detail with regard to the expanded granulate, however, as the grain-shaped heat-treated material is usually not transported via a pneumatic conveying line, no separation device is necessary. Thus the second material flow can be directly fed into the measuring container or can be conveyed via appropriate mechanical conveying means to the measuring container. Furthermore the heat treatment parameters, such as e.g. temperature, conveying speed or retention time, can be adapted as well as a heat profile, in case the calcination device is equipped with a plurality of individually controlled heating elements. With regard to the system it shall not remain unsaid that the calcination device replaces the expansion device described before.

In a further embodiment it is provided that the calcination device is configured as a rotary kiln and the grain-shaped feed material and the grain-shaped heat-treated material respectively are conveyed through the rotary kiln continuously.

In a further embodiment of the method it is provided that the second material flow is concentrated before being directed into the measurement container. For the system it is provided that a means for concentrating the second material flow is disposed between the release opening of the calcination device and the at least one measuring container.

In a further embodiment of the method it is provided that the calcination device comprises a rotary kiln, in which the heat treatment takes place, and the grain-shaped feed material as well as the grain-shaped heat-treated material are conveyed through the rotary kiln continuously.

In a further embodiment of the method it is provided that the heat treatment parameters contain: (pre-set) heat treatment temperature, (measured) average heat treatment temperature, (measured) minimum heat treatment temperature, (measured) maximum heat treatment temperature, heat treatment temperature profile, heat treatment conveying speed and/or heat treatment retention time.

In a further embodiment of the method it is provided that a heat treatment temperature within the calcination device lies between 250° C. and 1000° C.

In a further embodiment of the method it is provided that upon detection of a deviation of the determined bulk density from the at least one desired bulk density a heat treatment temperature within the calcination device is increased.

If the method shall account for variable changes of the bulk density with regard to the currently produced heat-treated material instead of having set values for the desired bulk density, it is provided that the desired bulk density is continuously or periodically adjusted depending on the actually determined bulk densities in order to detect fluctuations in the bulk density of the grain-shaped heat-treated material.

In a further embodiment of the system it is provided that the device for measuring the bulk density is positioned adjacent to the release opening of the calcination device, preferably connected via means for gravity transport such as a chute.

In a further embodiment of the system it is provided that the device for measuring the bulk density is positioned underneath the release opening of the calcination device, so that the produced heat-treated material is directly fed from the release opening into the measurement container, preferably via a concentration means such as a funnel.

In a further embodiment of the system it is provided that the device for measuring the bulk density is disposed in a drop section of a conveying line being connected to the release opening of the calcination device. It is not obligatory that the measuring device is in the direct vicinity of the calcination device, as the heat-treated material can be conveyed to the measuring device via appropriate conveying means such as conveying belts or screw conveyors. However, due to the design of the measuring container, it is required that the measuring device is disposed in a drop section of the conveying system, so that the heat-treated material can flow through the openings in the base surface of the measuring container.

BRIEF DESCRIPTION OF THE FIGURES

A detailed description of a method according to the invention and a device according to the invention now follows. In the figures.

DETAILED DESCRIPTION OF EXEMPLARY EMBODIMENTS OF THE INVENTION

Figure 1:
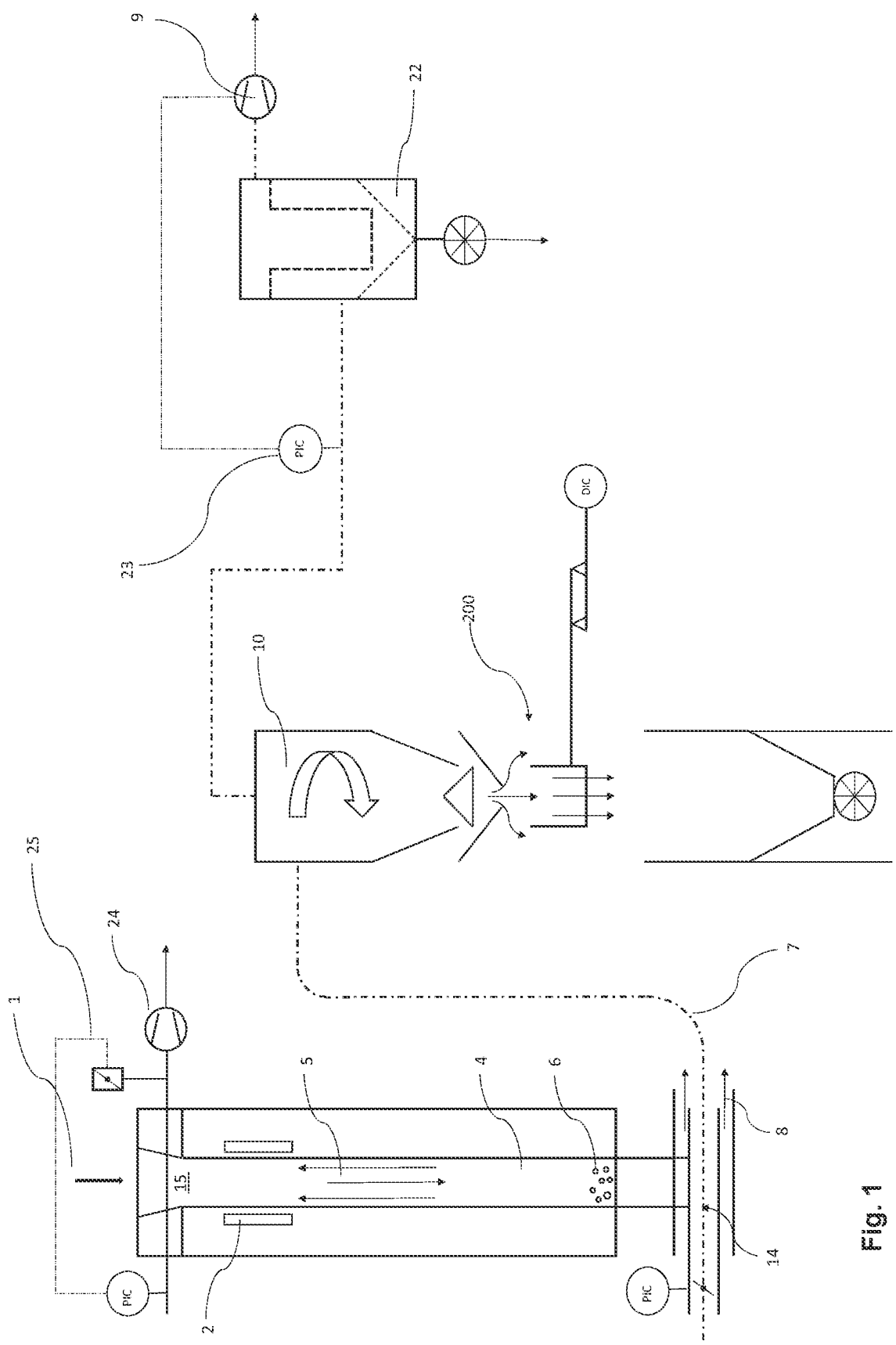
FIG. 1 shows a schematic image of a system for expansion of a sand-grain shaped raw material with a device for measuring bulk density.

FIG. 1 shows a system for expansion of sand grain-shaped raw material 1. In this case, the raw material 1 falls through a vertical shaft 4 which can be heated by means 2 for forming a temperature profile 3, in the present embodiment a plurality of electrical resistance heaters 2 are used. The raw material is fed in the head region 15 of the shaft 4. Since the resistance heaters 2 can be controlled individually, a specific temperature profile 3 can be established along the shaft 4. As a result of the thermal radiation which acts on the raw material 1 from the shaft 4, the raw material 1 expands to form expanded granulate 6. Due to the heated walls of the shaft 4 and the ensuing process air 16, a shaft flow 5 is established in the shaft 4.

An additional extraction device 24 is provided in the head region 15 of the shaft 4, which extracts process air 16 from the head region 15 and thus stabilizes the shaft flow 5. In addition, a control loop 25 is coupled to the additional extraction device 24 which regulates the fraction of extracted process air 16 and sucked-in ambient air. Likewise, process air 16 can be blown into the head region 15 to stabilize the shaft flow 5 either by this additional extraction device 24 or by another device not shown here.

Located at the lower end of the shaft 4 is a dosing element 14 which regulates the quantity of granulate 6 conveyed from the shaft 4 into the pneumatic conveying line 7. In alternative embodiments, this dosing element 14 is not provided, with the result that the shaft 4 opens directly into the conveying line 7.

An extraction device 9, which is preferably designed as a fan, is mounted at one end of the pneumatic conveying line 7 which sucks ambient air from the other end of the conveying line 7, which is designed to be open to the atmosphere and thus conveys expanded granulate 6. A gas cyclone 10 is located inside this conveying line 7 via which granulate 6 is separated from the conveying line. Located in the conveying line 7 is a filter system 22 which is preferably disposed between gas cyclone 10 and extraction device 9 which separates small particles from the conveying line 7. By measuring the differential pressure by means of an additional measuring device 23, the conveyed quantity of the extraction device 9 is controlled so that the flow velocity in the conveying line 7 remains constant even when the filter system 22 is contaminated.

Figure 2:
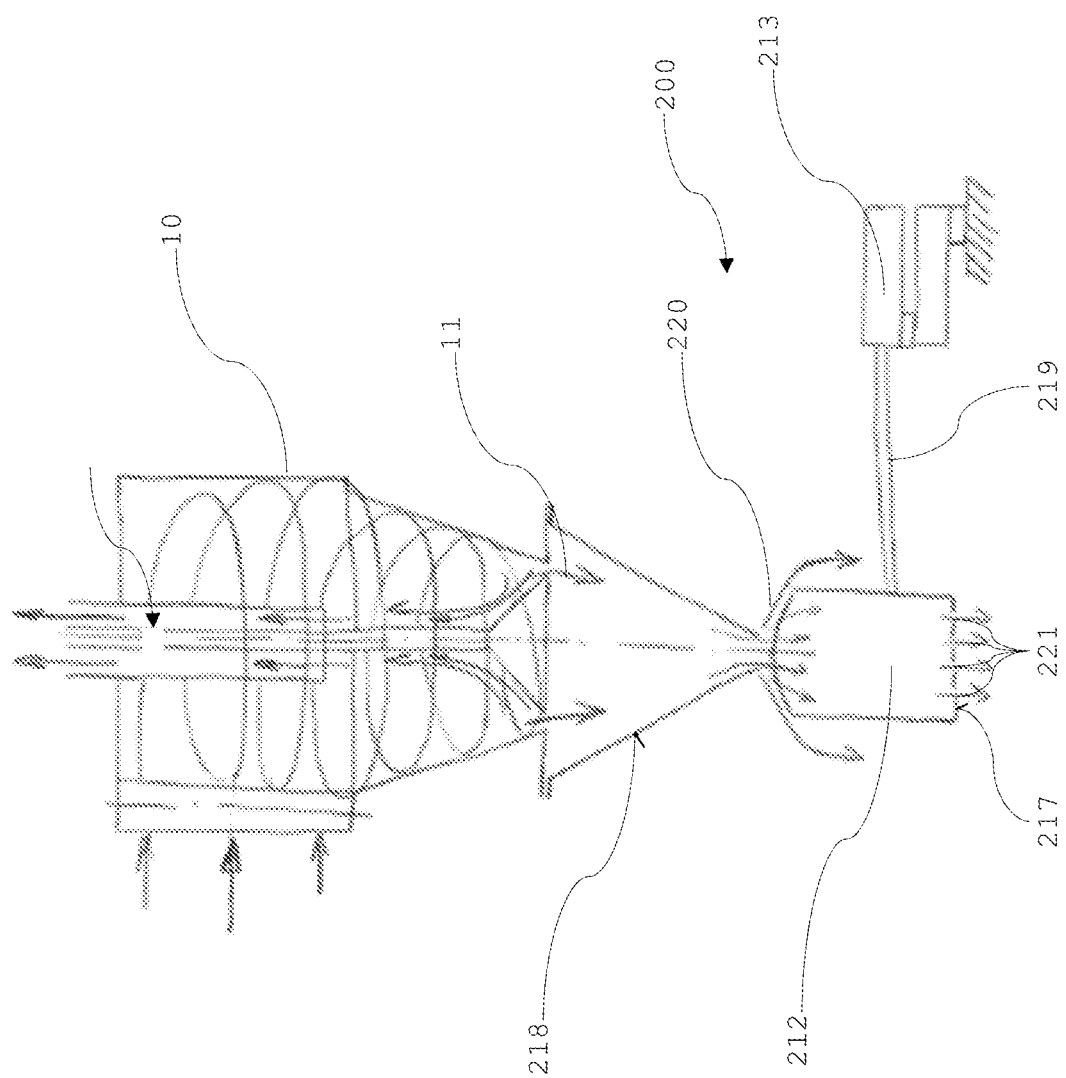
FIG. 2 shows a detailed view of the device for measuring bulk density.

FIG. 2 shows a detailed view of a device 200 for measuring bulk density of the expanded granulate 6 which is separated from the conveying line 7 as a granulate flow 11 by means of a separating device, here designed as a gas cyclone 10, which is connected to the pneumatic conveying line 7. In this embodiment a measuring container 212 is mounted underneath the gas cyclone 10 in the operating state, which receives at least a part of the granulate flow 11 which is separated from the conveying line 7 in the gas cyclone 10. In order to concentrate this granulate flow 11, a funnel 218 is located between the gas cyclone 10 and the measuring container 212. Preferably the longitudinal axes of the gas cyclone 10, the funnel 218 and the measuring container 212 coincide to form one axis. The part of the granulate flow 11 which cannot be received by the measuring container 212 can escape from this by means of an overflow 220 over the edge of the measuring container 212. The measuring container 212 is connected via a side arm 219 to the measuring device which is designed as a weighing device 213. By determining the weight in the weighing device and the known volume of the measuring container 212, the bulk density of the expanded granulate 6 can thus be measured continuously. If deviations from the desired bulk density are determined, the temperature profile 3 of the shaft 4 is modified by reference to empirical values or the quantity of raw material fed to the shaft 4 is reduced on the basis of empirical values or both the temperature profile is modified and the quantity of raw material fed to the shaft 4 is reduced on the basis of empirical values.

FIG. 2 also shows that the measuring container 212 has a plurality of openings 221 in its base surface through which a part of the granulate flow 11 drains continuously. These openings 221 can have any shape, for example, rectangles, slots, or squares, where in particular circular openings 221 are preferably used.

Typical granule diameters of the expanded granulate 6 lie in the range of 0.5 to 5 mm. In order to ensure a continuous flow through the measuring container 212, the ratio between the granule diameter and the diameter of the openings 21 is preferably between 1:3 and 1:100, particularly preferably between 1:5 and 1:50, in particular between 1:5 and 1:25. For example, for a granule diameter of 2 mm and a factor of 30, a ratio of 1:10, the diameter of the openings 21 is obtained as 2 mm×10 as 20 mm.

Figure 3:
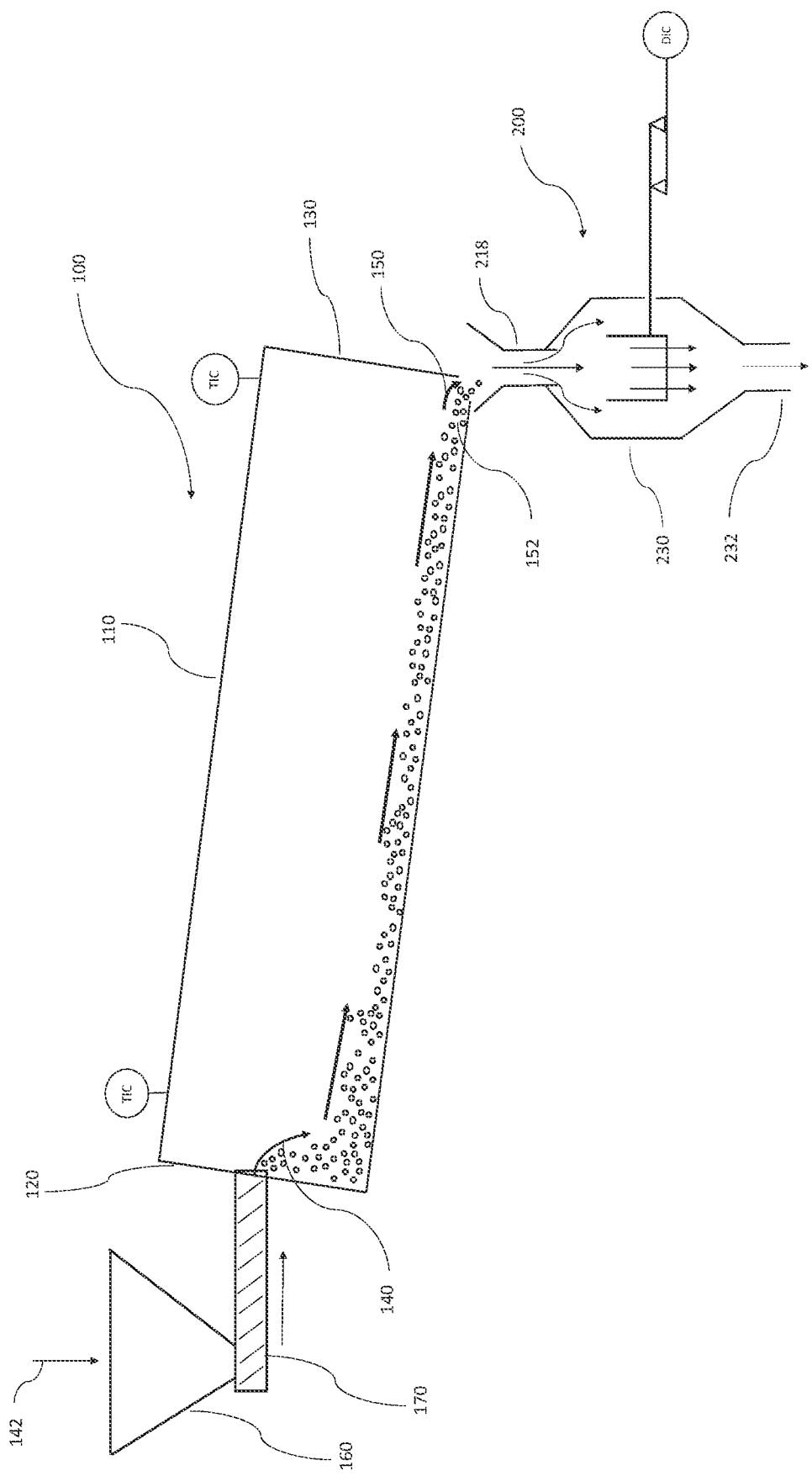
FIG. 3 shows a schematic image of a system for heat treatment of a grain-shaped feed material with a device for measuring bulk density.

FIG. 3 shows an alternate embodiment of a system in which the material directed into the measuring container 212 is not an expanded granulate 6 produced by a vertical heated shaft 4, but a grain-shaped heat-treated material 152 which is produced by a calcination device 100.

In order to remove water of crystallization or carbonate from a grain-shaped, preferably pre-refined, feed material 142, such as carbonated ore/minerals or hydrated ore/minerals, a first material flow 140 containing the feed material 142 is fed into the calcination device 100, in which it undergoes a heat treatment in order to achieve a thermal decomposition of the material within the calcination device 100. At the end of the heat treatment process a second material flow 150 containing the heat-treated material 152 is released from the calcination device 100 and fed into the device 200 for measuring bulk density, the design and functionality of which is described in detail with regard to FIG. 2. As the second material flow 150 containing the heat-treated material 152 is directly fed into the measuring container 212 of the device 200, which measuring container 212 is disposed adjacent to and underneath of a release opening 130 of the calcination device 100, no separation device is necessary compared to the embodiment described in FIG. 2. As mentioned before, the second material flow 150 is concentrated via funnel 218 before it is directed into the measuring container 212. Furthermore the embodiment of the device 200 depicted in FIG. 3 is housed in a housing 230 in order to guide the part of the second material flow 150, which does not flow through the measuring container 212, to an outlet opening 232, from which the second material flow 150 can be conveyed to a packaging station or a further processing station.

In the present embodiment the calcination device 100 comprises a rotary kiln 110, in which the heat treatment is carried out, which rotary kiln 110 has a feed opening 120 for receiving the first material flow 140 containing the feed material 142 and the release opening 130 for releasing the second material flow 150 containing the heat-treated material 152 into the device 200. The calcination device 100 further comprises a feeding hopper 160, in which the feed material 142 is inserted, and a screw conveyor 170, which continuously conveys the feed material 142 from the feeding hopper 160 to the feed opening 120 thus creating the first material flow 140.

The method and the system described above are especially suitable for heat treatment of kaoline (terra alba), dolomite, gypsum or aluminium hydroxide.

REFERENCE LIST

1 Sand grain-shaped raw material
2 Means for forming a temperature profile (resistance heaters)
3 Temperature profile
4 Shaft
Shaft flow
6 Expanded granulate
7 Pneumatic conveying line
8 Conveying flow
9 Extraction device
10 Gas cyclone
11 Granulate flow
14 Dosing element
15 Head region
16 Process air
22 Filter system
23 Additional measuring device
24 Additional extraction device
25 Control loop
100 Calcination device
110 Rotary kiln
120 Feed opening
130 Release opening
140 First material flow
142 Grain-shaped feed material
150 Grain-shaped heat-treated material
152 Second material flow
160 Feeding hopper
170 Screw conveyor
200 Device for measuring bulk density
212 Measuring container
213 Measuring device
217 Base surface
218 Funnel
219 Side arm
220 Overflow
221 Openings
230 Housing
232 Outlet opening

What is claimed is:

1. A method for heat treatment of a grain-shaped feed material wherein a first material flow containing the grain-shaped feed material is fed into one end of a calcination device;
   wherein the grain-shaped feed material undergoes a heat treatment within the calcination device in order to produce grain-shaped heat-treated material by removing water of crystallization and/or carbon dioxide from the grain-shaped feed material;
   wherein a second material flow containing the grain-shaped heat-treated material is released from a second end of the calcination device;
   wherein the second material flow is directed into a measuring container;
   wherein the measuring container comprises a base surface having openings through which openings at least one part of the second material flow being directed into the measuring container is draining continuously;
   wherein the measuring container is connected to a weighing device;
   wherein a weight of the grain-shaped heat-treated material flowing through the measuring container is continuously measured by the weighing device in order to determine the bulk density of the grain-shaped heat-treated material flowing through the measuring container and to detect deviations from at least one desired bulk density of the grain-shaped heat-treated material; and wherein upon detection of a deviation of the determined bulk density from the at least one desired bulk density at least one heat treatment parameter of the heat treatment is adapted automatically or manually.

2. The method according to claim 1, wherein the calcination device comprises a rotary kiln and the grain-shaped feed material as well as the grain-shaped heat-treated material respectively are conveyed through the rotary kiln continuously.

3. The method according to claim 1, wherein the second material flow is concentrated before being directed into the measurement container.

4. The method according to claim 1, wherein the heat treatment parameters contain: actual heat treatment temperature, average heat treatment temperature, minimum heat treatment temperature, maximum heat treatment temperature, heat treatment temperature profile, heat treatment conveying speed and/or heat treatment retention time.

5. The method according to claim 1, wherein a heat treatment temperature within the calcination device lies between 250° C. and 1000° C.

6. The method according to claim 1, wherein upon detection of a deviation of the determined bulk density from the at least one desired bulk density a heat treatment temperature within the calcination device is increased.

7. The method according to claim 1, wherein the desired bulk density is continuously or periodically adjusted depending on the actually determined bulk densities in order to detect fluctuations in the bulk density of the grain-shaped heat-treated material.

* * * * *